United States Patent
Li et al.

(10) Patent No.: US 8,565,418 B2
(45) Date of Patent: Oct. 22, 2013

(54) METHOD, DEVICE AND SYSTEM FOR EXTENDING CHANNELS

(75) Inventors: Cheng Li, Chengdu (CN); Guozhu Long, Santa Clara, CA (US); Jie Lv, Shenzhen (CN); Huishen Dong, Shenzhen (CN); Liming Fang, Santa Clara, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/482,642

(22) Filed: May 29, 2012

(65) Prior Publication Data
US 2012/0237017 A1 Sep. 20, 2012

Related U.S. Application Data

(63) Continuation of application No. PCT/CN2010/079460, filed on Dec. 6, 2010.

(30) Foreign Application Priority Data

May 13, 2010 (CN) .......................... 2010 1 0176141

(51) Int. Cl.
*H04M 7/00* (2006.01)
(52) U.S. Cl.
USPC .......................................... 379/417; 455/295
(58) Field of Classification Search
USPC ...................... 379/406.01, 416, 417; 455/295
See application file for complete search history.

(56) References Cited

U.S. PATENT DOCUMENTS

| 6,507,608 | B1 | 1/2003 | Norrell |
| 7,852,951 | B2* | 12/2010 | Kalluri et al. ................. 375/260 |
| 8,391,125 | B2* | 3/2013 | Zhou et al. .................... 370/201 |
| 2003/0201802 | A1 | 10/2003 | Young |
| 2005/0018777 | A1* | 1/2005 | Azadet .......................... 375/257 |
| 2006/0104436 | A1 | 5/2006 | Tesler et al. |
| 2006/0159186 | A1* | 7/2006 | King ............................. 375/258 |
| 2006/0268966 | A1 | 11/2006 | Cioffi et al. |
| 2008/0239937 | A1* | 10/2008 | Erickson et al. ............. 370/201 |
| 2011/0222611 | A1* | 9/2011 | Lindqvist et al. ............. 375/257 |

FOREIGN PATENT DOCUMENTS

| CN | 101436880 A | 5/2009 |
| GB | 2137750 A | 10/1984 |
| WO | 9527353 A3 | 10/1995 |
| WO | 2006075247 A1 | 7/2006 |

OTHER PUBLICATIONS

International Search Report in corresponding International Patent Application No. PCT/CN2010/079460 (Mar. 17, 2011).

(Continued)

*Primary Examiner* — Md S Elahee
*Assistant Examiner* — Akelaw Teshale
(74) *Attorney, Agent, or Firm* — Leydig, Voit & Mayer, Ltd.

(57) ABSTRACT

The present invention provides a method, a device and a system for extending channels, and belongs to the field of communications technologies. The method includes: generating a non-cascade extended channel by using a first channel and a second channel; and generating a first-level cascade extended channel by using the non-cascade extended channel and a third channel, where the first channel and the second channel are both twisted-pair channels, and the third channel is a twisted-pair channel or another non-cascade extended channel. The device includes a first transformer and a second transformer. The system includes a first device and a second device.

8 Claims, 5 Drawing Sheets

(56) References Cited

OTHER PUBLICATIONS

Extended European Search Report in corresponding European Patent Application No. 10851307.8 (Sep. 5, 2012).
Lee et al., "Binder MIMO Channels," IEEE Transactions on Communications, Aug. 2007, vol. 55, No. 8, IEEE, Washington, D.C.
1st Office Action in corresponding Chinese Patent Application No. 201010176141.0 (Jun. 5, 2013).
Written Opinion of the International Searching Authority in corresponding PCT Patent Application No. PCT/CN2010/079460 (Mar. 17, 2011).

* cited by examiner

METHOD, DEVICE AND SYSTEM FOR
EXTENDING CHANNELS

CROSS-REFERENCE TO RELATED APPLICATIONS

This application is a continuation of International Application No. PCT/CN2010/079460, filed on Dec. 6, 2010, which claims priority to Chinese Patent Application No. 201010176141.0, filed on May 13, 2010, both of which are incorporated herein by reference in their entireties.

FIELD OF THE INVENTION

The present invention relates to the field of communications technologies, and in particular, to a method, a device and a system for extending channels.

BACKGROUND OF THE INVENTION

Twisted pairs are a type of universal wirings formed by winding two mutually insulated conductors according to certain specifications, and belong to information communication network transmission medium. The twisted pairs are classified into STPs (Shielded Twisted Pair) and UTPs (Unshielded Twisted Pairs). The UTPs are widely used in Ethernet and telephone lines, and a type of UTPs formed by four pairs of transmission lines of different colors are usually used in Ethernet data transmission. In telephone trunk lines, a cable is generally formed by many (for example, 25, 100 or more) UTPs. Technologies for transmitting signals based on UTPs are numerous, where technologies such as ADSL (Asymmetric Digital Subscriber Line), HDSL (High bit Rate DSL) already have a wide application base. For the convenience of description, the technologies such as ADSL and HDSL are generally called xDSL technology.

In a conventional xDSL technology for transmitting signals based on UTPs, N UTPs are generally used as N channels to transmit signals. With the further development of high-speed services, the communications capacity of the xDSL technology and the access rate provided by the xDSL technology cannot meet the requirements of users. Accordingly, a method for extending channels is provided in the conventional art. In a series common mode, based on the N channels of the N UTPs, (N−1) channels are extended, and the number of the extended channels is up to 2N−1. According to the method, a new channel is extended between each two adjacent UTPs, the transmission manner of the original channel is not changed, and the DM (Differential Mode) of the channel is still used to transmit signals, while a signal transmitted over the extended channel is divided into two parts, which are transmitted separately by using the CM (Common Mode) of the corresponding two original channels, and common-mode signals over the two channels are differentiated at a receiving end to obtain a signal of the extended channel.

However, in the conventional art, a signal transmitted over the extended channel is divided into two parts, which are transmitted by using a UTP separately, so the transmission performance of the extended channel is not maximized.

SUMMARY OF THE INVENTION

In order to improve the transmission performance of extended channels, embodiments of the present invention provide a method, a device and a system for extending channels. The technical solutions are as follows.

A method for extending channels is provided, where the method includes:

generating a non-cascade extended channel by using a first channel and a second channel; and generating a first-level cascade extended channel by using the non-cascade extended channel and a third channel, where the first channel and the second channel are both twisted-pair channels, and the third channel is a twisted-pair channel or another non-cascade extended channel.

A device for extending channels is provided, where the device includes:

a first transformer, connected to a first channel, and having a first central tap; and a second transformer, connected to a second channel, and having a second central tap, where a signal over the first central tap is a common-mode signal of the first channel, a signal over the second central tap is a common-mode signal of the second channel, and the signal over the first central tap and the signal over the second central tap are differentiated to generate a common-mode non-cascade extended channel; and the first channel and the second channel are both twisted-pair channels.

A system for extending channels is provided, where the system includes a first device and a second device. The first device is any one of the devices for extending channels and is a device at a network side. The second device is any one of the devices for extending channels and is a device at a user side.

According to the technical solutions provided by the embodiments of the present invention, a cascade extended channel is generated based on a non-cascade extended channel, and after a signal over the cascade extended channel is divided into two parts, a signal passing through the part of the non-cascade extended channel is transmitted by using two pairs of twisted-pair channels. Compared with the prior art, as more twisted-pair channels are used, the transmission performance of the extended channel is improved.

DETAILED DESCRIPTION OF THE EMBODIMENTS

In order to make the objectives, technical solutions and advantages of the present invention more comprehensible, the present invention is described in further detail below with reference to the accompanying drawings.

Embodiment 1

Figure 1:
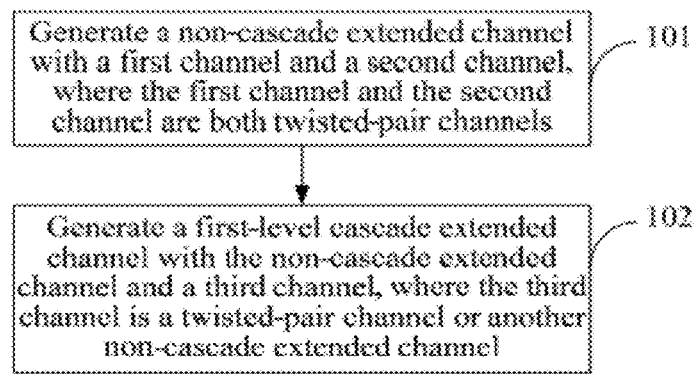
FIG. 1 is a flowchart of a method for extending channels provided by Embodiment 1 of the present invention.

Referring to FIG. 1, this embodiment provides a method for extending channels, where the method includes the following steps:

101: Generate a non-cascade extended channel (Non-Cascade Extended Channel, NCEC) by using a first channel and a second channel, where the first channel and the second channel are both twisted-pair channels.

102: Generate a first-level cascade extended channel (Cascade Extended Channel, CEC) by using the non-cascade extended channel and a third channel, where the third channel is a twisted-pair channel or another non-cascade extended channel.

In the embodiment of the present invention, the non-cascade extended channel refers to an extended channel generated by two twisted-pair channels, and the cascade extended channel refers to a new extended channel generated by an existing extended channel and another channel, that is, among the two channels used for generating the new extended channel, one channel is an existing extended channel for sure, and the type of the other channel is not limited, and the other channel may be a channel of any type, including a twisted-pair channel, a non-cascade extended channel, and a cascade extended channel. Additionally, the type and the level of the existing extended channel are also not limited, and the existing channel may be a non-cascade extended channel or a cascade extended channel, and when the existing channel is a cascade extended channel, it may be a cascade extended channel of any level, which is not limited in the embodiment of the present invention.

The method may specifically include the following steps:

A common-mode signal of the first channel and a common-mode signal of the second channel are differentiated to generate a non-cascade extended channel.

A common-mode signal of the non-cascade extended channel and a common-mode signal of the third channel are differentiated to generate a first-level cascade extended channel, where the first channel and the second channel are both twisted-pair channels, and the third channel is a twisted-pair channel or another non-cascade extended channel.

In this embodiment, merely the common-mode signals of the first channel, the second channel and the third channel are involved, while differential-mode signals of the first channel, the second channel and the third channel are not involved, and the differential-mode signals of them may be used to transmit signals following an existing process, which is not limited in the embodiment of the present invention.

Figure 2:
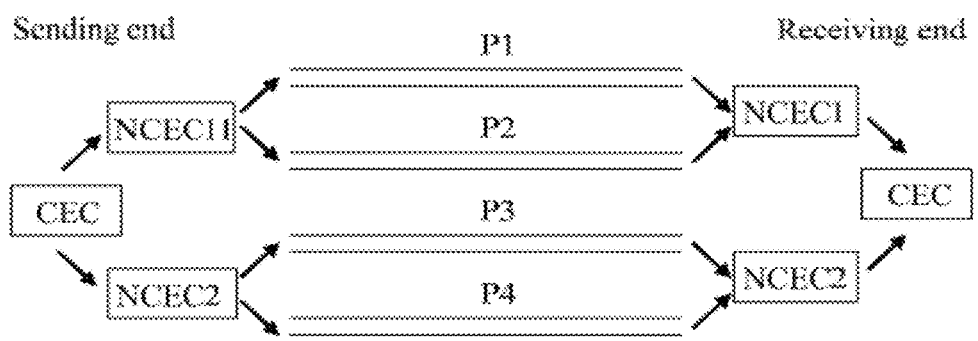
FIG. 2 is a schematic diagram of 3 extended channels generated by 4 twisted-pair channels provided by Embodiment 1 of the present invention.

Referring to FIG. 2, a situation that 3 extended channels are generated by 4 twisted pairs is taken as an example for description. In the embodiment of the present invention, when generating a non-cascade extended channel, preferably, a situation that different non-cascade extended channels share one twisted pair is avoided, so as to prevent the generation of interference. In FIG. 2, the 4 twisted pairs Pair1, Pair2, Pair3 and Pair4 are respectively identified as P1, P2, P3 and P4. Common-mode signals of P1 and P2 are differentiated to generate 1 non-cascade extended channel NCEC1, common-mode signals of P3 and P4 are differentiated to generate 1 non-cascade extended channel NCEC2, and then common-mode signals of NCEC1 and NCEC2 are differentiated to generate a first-level cascade extended channel CEC, so as to obtain 3 extended channels in total. The extended channels obtained in this situation have a symmetrical structure, and all the extended channels are balanced channels.

Figure 3:
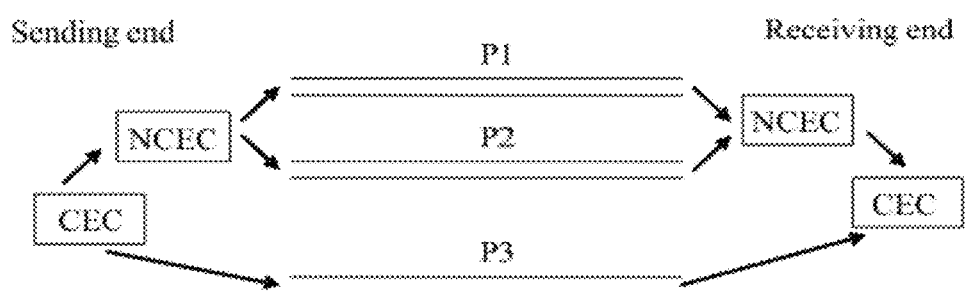
FIG. 3 is a schematic diagram of 2 extended channels generated by 3 twisted-pair channels provided by Embodiment 1 of the present invention.

Referring to FIG. 3, a situation that 2 extended channels are generated by 3 twisted pairs is taken as an example for description. In FIG. 3, 3 twisted pairs Pair1, Pair2 and Pair3 are respectively identified as P1, P2 and P3. Common-mode signals of P1 and P2 are differentiated to generate 1 non-cascade extended channel NCEC, and then common-mode signals of P3 and NCEC are differentiated to generate 1 first-level cascade extended channel CEC, so as to obtain 2 extended channels in total. The extended channels obtained in this situation have an asymmetrical structure, where the NCEC is a balanced channel, and the first-level CEC is an unbalanced channel.

In this embodiment, after generating the first-level cascade extended channel, the method may further include the following step:

A common-mode signal of any one of the cascade extended channels that are generated and a common-mode signal of a fourth channel are differentiated to generate a new cascade extended channel, where the fourth channel is a twisted-pair channel, a non-cascade extended channel or any one of the cascade extended channels that are generated.

In this embodiment, the level of the cascade extended channel may be first level, second level, . . . , $N^{th}$ level, where N is a natural number greater than 2. Generally, the first-level cascade extended channel is a lowest-level cascade extended channel, and the N-level cascade extended channel is a highest-level cascade extended channel. The number of the levels of the cascade extended channels that are generated may be determined according to requirements, which is not limited in the embodiment of the present invention.

In this embodiment, the transmission performance of the balanced channel is superior to that of the unbalanced channel. Therefore, preferably, a symmetrical structure is used to generate the extended channel, so as to ensure that the extended channel is a balanced channel.

Additionally, an end of communication is described in the above description, where the end may be a sending end, and may also be a receiving end. In an actual transmission system, the sending end and the receiving end are completely symmetrical, and the circuit structures of the two ends are completely the same, so details are not described here again.

According to the method provided by this embodiment, a cascade extended channel is generated based on a non-cascade extended channel, and after a signal over the cascade extended channel is divided into two parts, a signal passing through the part of the non-cascade extended channel is transmitted by using two pairs of twisted-pair channels. Compared with the prior art, as more twisted-pair channels are used, the transmission performance of the extended channel is improved.

Additionally, in the implementation of the present invention, the inventors find that, according to the solution of the prior art, in a signal of a current extended channel received at the receiving end, sent signals of two extended channels adjacent to the current extended channel are coupled, resulting in strong interference between lines. Crosstalk exists between existing UTPs, including new end crosstalk (NEXT) and far-end crosstalk (FEXT). As xDSL uplink and downlink channels adopt frequency division multiplexing, the near-end crosstalk does not cause much harm on the performance of the system. However, the far-end crosstalk seriously influences the transmission performance of the line, for example, the rate of some lines is lowered, the performance is unstable, and even some lines cannot be opened. In comparison, in the prior art, as the strength of the interference caused by the extended channel is much bigger than that of the far-end crosstalk, the interference seriously influences the transmission performance of the line. A technology for eliminating the far-end crosstalk exists at present, for example, a technology for jointly sending at a DSLAM (Digital Subscriber Line Access Multiplexer, digital subscriber line access multiplexer) end and separately receiving at a user end, or a technology for respectively sending at a user end and jointly receiving at a DSLAM end. However, as the interference of the extended channel is much stronger than common crosstalk, so that it is very difficult to eliminate the interference, and it is very difficult to activate the channel, the transmission performance of the line is seriously influenced. According to the method provided by this embodiment, a cascade extended channel is generated based on a non-cascade extended channel, and moreover, the non-cascade extended channel and the cascade extended channel both use the common-mode signals of existing twisted-pair channels to transmit signals, so signal coupling between channels is prevented, and in comparison with the prior art, interference is significantly reduced, and the transmission performance of the line is improved.

Embodiment 2

Figure 4:
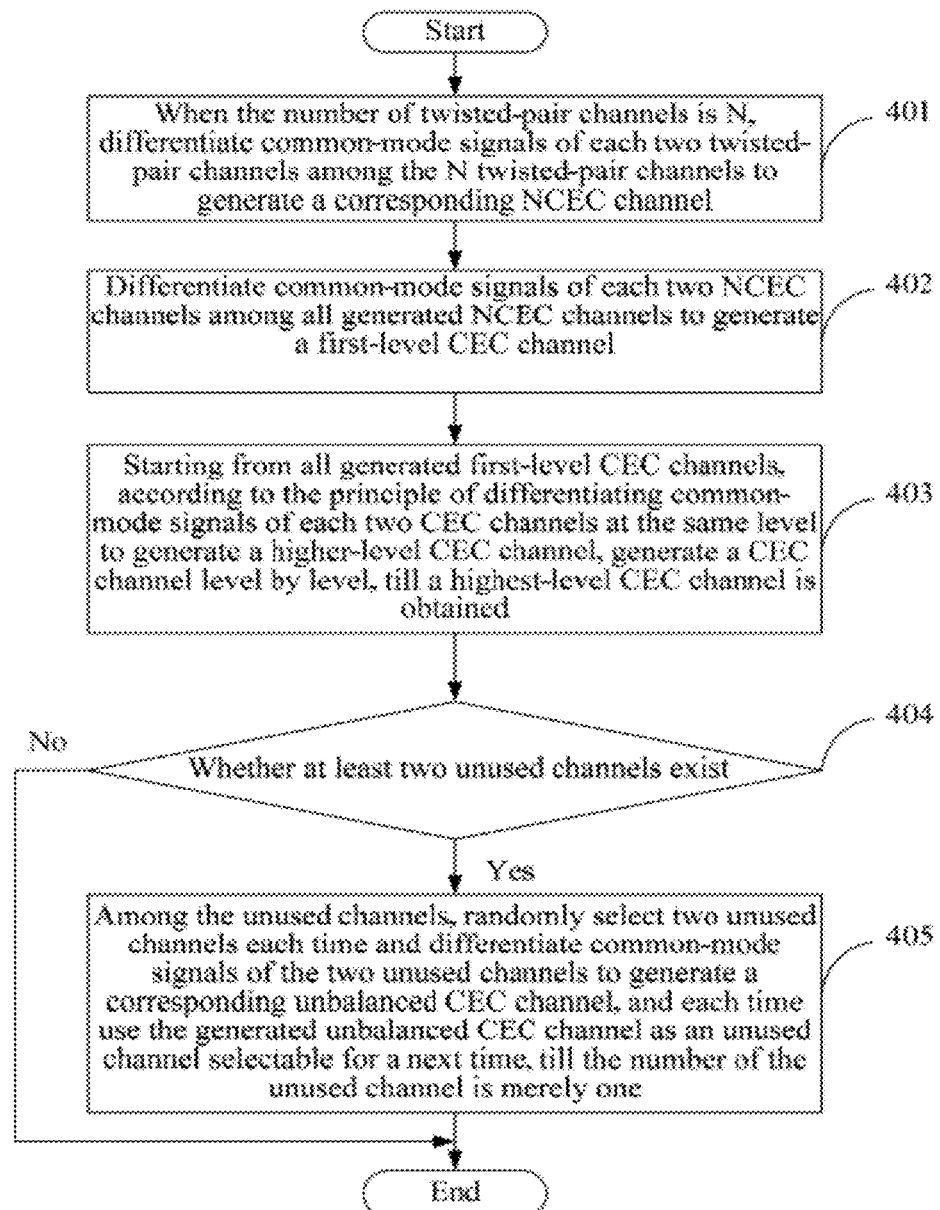
FIG. 4 is a flowchart of a method for extending channels provided by Embodiment 2 of the present invention.

Referring to FIG. 4, this embodiment provides a method for extending channels, where the method includes the following steps:

401: When the number of twisted-pair channels is N, where N is a natural number greater than 2, differentiate common-mode signals of each two twisted-pair channels among the N twisted-pair channels to generate a corresponding NCEC channel.

In this step, the number of obtained NCEC channels is $$\text{floor}\left(\frac{N}{2^1}\right),$$

where floor( ) represents rounding down the number in brackets to an integer part.

402: Differentiate common-mode signals of each two NCEC channels among all generated NCEC channels to generate a first-level CEC channel.

The number of the first-level CEC channels obtained in this step is $$\text{floor}\left(\frac{N}{2^2}\right),$$

and the first-level CEC channels are all balanced CEC channels.

403: Starting from all generated first-level CEC channels, according to the principle of differentiating common-mode signals of each two CEC channels at the same level to generate a higher-level CEC channel, generate a CEC channel level by level, till a highest-level CEC channel is obtained, and the number of the highest-level CEC channel is merely one.

Up to this point, the number of all the extended channels that are generated is $$\text{floor}\left(\frac{N}{2^1}\right) + \text{floor}\left(\frac{N}{2^2}\right) + \ldots \text{floor}\left(\frac{N}{2^n}\right),$$

where n=floor($\log_2$ N), and represents that the highest level of the CEC channel is n level, and the number of the n-level CEC channel is 1, and at this time, a new CEC channel cannot be generated.

404: Determine whether at least two unused channels exist, where the unused channel refers to a twisted-pair channel, an NCEC channel or a CEC channel of which the common-mode signal is not used, and if at least two unused channels exist, execute step 405; otherwise, end the process.

If N is a power of 2, a determination result is no, and at this time, merely 1 CEC channel, of which the common-mode signal is not used, exists, that is, the highest-level CEC channel exists, and the total number of the extended channels obtained in this case is N–1, including NCEC channels and CEC channels.

If N is not a power of 2, a determination result is yes, and at this time, the unused channels may be further used to generate new extended channels, and the further generated new extended channel are unbalanced CEC channels.

405: Among the unused channels, randomly select two unused channels each time and differentiate common-mode signals of the two unused channels to generate a corresponding unbalanced CEC channel, and each time use the generated unbalanced CEC channel as an unused channel selectable for a next time, till the number of the unused channel is merely one, and at this time, a new CEC channel cannot be generated, and the process is ended.

Up to this point, the number of the extended channels that are generated is N–1 in total, including all the NCEC channels and CEC channels. The total number of all the unbalanced CEC channels generated in this step is:

$$(N-1) - \left(\text{floor}\left(\frac{N}{2^1}\right) + \text{floor}\left(\frac{N}{2^2}\right) + \ldots + \text{floor}\left(\frac{N}{2^n}\right)\right).$$

In this step, the generated CEC channel is an unbalanced CEC channel, and may influence the transmission performance. In order to improve the transmission performance of the channel, the following manner may be further adopted to generate an unbalanced CEC channel.

Among the unused channels, each time according to the sequence of a level from the twisted-pair channel to the NCEC channel and then to the CEC, and the sequence of the CEC channel from a low level to a high level, two levels of channels are selected and common-mode signals of the channels are differentiated to generate a corresponding unbalanced CEC channel, and each time the generated unbalanced CEC channel is used as an unused channel selectable for a next time, till the number of the unused channel is merely one.

Figure 5:
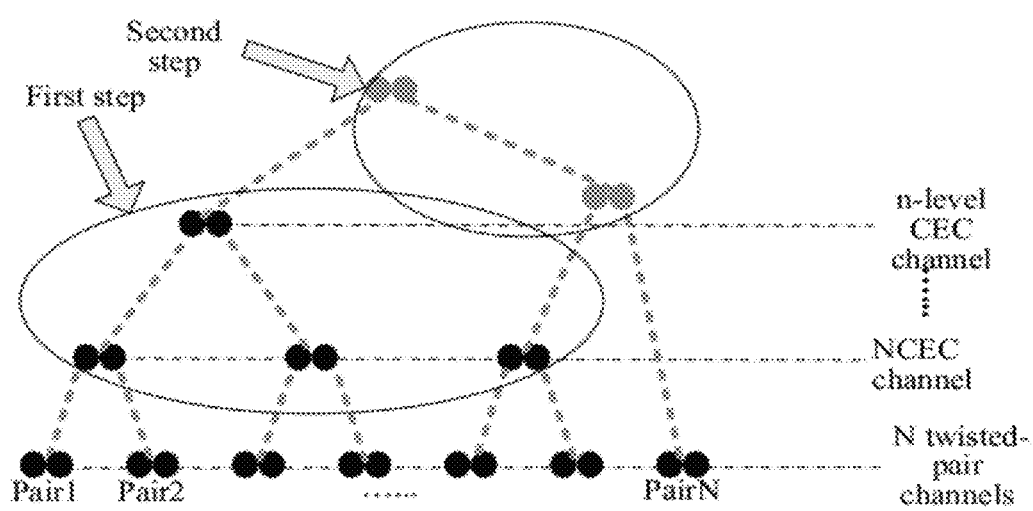
FIG. 5 is a schematic diagram of (N−1) channels obtained by extending N twisted-pair channels provided by Embodiment 2 of the present invention.

The process of the method for generating extended channels is schematically shown in FIG. 5. Referring to FIG. 5, N UTPs are shown, which correspond to N twisted-pair channels. A first step in FIG. 5 corresponds to step 401 to step 403, and includes: extending each two twisted-pair channels into an NCEC channel, then extending each two NCEC channels into a first-level CEC channel, extending each two first-level CEC channels into a second-level CEC channel, and so on, till a highest-level CEC channel, that is, an n-level CEC channel, is obtained. Up to this point, the extended channels that are obtained are all balanced channels, are longitudinally balanced in morphology, and are represented in black in FIG. 5. A second step in FIG. 5 corresponds to step 404 to step 405, and includes: among the unused channels, randomly selecting two unused channels each time, differentiating common-mode signals of the unused channels to generate a corresponding unbalanced CEC channel, and each time using the generated unbalanced CEC channel as an unused channel selectable for a next time, till the number of the unused channel is merely one. The extended channels obtained in this step are all unbalanced channels, are longitudinally unbalanced in morphology, and the rate that the extended channels can bear is always lower than that of the extended channels generated in the first step. The unbalanced channels are represented in gray in FIG. 5. Up to this point, the total number of the extended channels that are obtained is N−1.

In this embodiment, in order to improve the transmission performance of the extended channels, the method may further include the following step:

After all the unbalanced CEC channels are generated, the availability of a part or all of the unbalanced CEC channels is detected, and if an unavailable unbalanced CEC channel exists, the unavailable unbalanced CEC channel is disabled. The number of the unbalanced CEC channels that are detected may be set according to requirements, and may be a part or all of the unbalanced CEC channels, for example, 10 unbalanced CEC channels are generated, and the availability of 5 of the unbalanced CEC channels is detected, or the availability of the 10 unbalanced CEC channels is detected, which is not limited in the embodiment of the present invention.

In this embodiment, although the NCEC channels and the CEC channels, which generated in step 401 to step 403, meet the requirement of being longitudinally balanced in morphology, as the length and the properties of original N pairs of lines are different, a newly generated NCEC channel or CEC channel may not meet the requirement of being longitudinally balanced. Therefore, in this embodiment, the following implementation manner may be further adopted to improve the transmission performance.

After the extended channels are generated, the availability of the extended channels that are generated is detected, and if an unavailable extended channel exists, the unavailable extended channel is disabled; the extended channels may be NCEC channels or CEC channels, or include both NCEC channels and CEC channels, and the NCEC channels that are detected may be a part or all of the generated NCEC channels, and the CEC channels that are detected may be a part or all of the generated CEC channels, which is not limited in the embodiment of the present invention.

In any implementation manner, the availability of the unbalanced CEC channel may be detected by many means, including, but not limited to, detecting a longitudinal balance degree or rate of the unbalanced CEC channel, and of course, other performance indicators that can reflect whether the channel is available may also be detected, which is not limited in the embodiment of the present invention. For example, a first threshold corresponding to the longitudinal balance degree is preset, and if it is detected that there exists an unbalanced CEC channel that does not meet the first threshold, the unbalanced CEC channel is disabled; or, a second threshold corresponding to the rate is preset, and if it is detected that there exists an unbalanced CEC channel that does not meet the second threshold, the unbalanced CEC channel is disabled. Of course, the longitudinal balance degree and the rate may be combined to be applied, that is, both the first threshold and the second threshold are preset, and the longitudinal balance degree and the rate are detected at the same time. The process is the same as the process described above, and details are not described here again.

The method provided by this embodiment may be performed at the sending end, and may also be performed at the receiving end. When the method is performed at the sending end, signals are sent through the twisted-pair channels and the extended channels, and when the method is performed at the receiving end, signals are received through the twisted-pair channels and the extended channels.

In this embodiment, when the method is performed at the receiving end, in order to cancel the crosstalk, the method may further include the following step:

If the total number of all the extended channels that are generated is M, where M is a natural number, and all the extended channels include NCEC channels and CEC channels, after signals are received from the N twisted-pair channels and M extended channels, a crosstalk cancellation process is performed on received signals, where a crosstalk cancellation matrix used in the crosstalk cancellation process is a matrix of (N+M) rows and (N+M) columns on each sub-carrier.

In this embodiment, the total number of the twisted-pair channels and the extended channels is N+M, and a corresponding channel transmission matrix is H, and as for each sub-carrier, H is an (N+M)×(N+M) matrix. It is assumed that x is a signal sending vector of (N+M)×1, y is a signal receiving vector of (N+M)×1, and n is a noise vector of (N+M)×1, and then the channel transmission equation may be expressed as:

$$y = Hx + n \quad (1)$$

specifically, after a crosstalk cancellation process is performed on the received signals in an uplink direction, the channel transmission equation (1) is changed as:

$$\tilde{y} = WHx + Wn \quad (2)$$

where W is an (N+M)×(N+M) crosstalk cancellation matrix, and when WH is a diagonal matrix, the crosstalk is eliminated.

In this embodiment, when the method is performed at the sending end, in order to cancel the crosstalk, the method may further include the following step:

If the total number of all the extended channels that are generated is M, where M is a natural number, and all the extended channels include NCEC channels and CEC channels, when a signal is sent to the N twisted-pair channels and M extended channels, first, a vector precoding process is performed on the signal, and then the signal is sent, where a vector precoding matrix used in the vector precoding process is a matrix of (N+M) rows and (N+M) columns on each sub-carrier.

Specifically, when vector precoding is performed on a sent signal in a downlink direction, the sent signal may be expressed as:

$$\tilde{x} = Px \quad (3)$$

accordingly, the channel transmission equation (1) is changed as:

$$\tilde{y} = HPx + n \quad (4)$$

where P is an (N+M)×(N+M) vector precoding matrix, and when HP is a diagonal matrix, the crosstalk is eliminated.

According to the method provided by this embodiment, a cascade extended channel is generated based on a non-cascade extended channel, and after a signal over the cascade extended channel is divided into two parts, a signal passing through the part of the non-cascade extended channel is transmitted by using two pairs of twisted-pair channels. Compared with the prior art, as more twisted-pair channels are used, the transmission performance of the extended channel is improved. The CEC channel is generated based on the NCEC channel, and both the NCEC channel and the CEC channel use the common-mode signals of the twisted-pair channels to transmit extended signals, so signal coupling between channels is prevented, and compared with the prior art, interference is significantly reduced, and the transmission performance of the line is improved. Moreover, in the manner of first generating a balanced CEC channel and then generating an unbalanced CEC channel, a maximum number of extended channels may be obtained. When an unused channel is selected to generate an unbalanced CEC channel in the sequence of a level from the twisted-pair channel to the NCEC channel and then to the CEC channel, and the sequence of the CEC channel from a low level to a high level, the transmission performance of the channel may be maximized. Additionally, the availability of the extended channel is detected, and an unavailable extended channel may be disabled, so that the transmission performance of the channel may be further improved, the flexibility is improved, and the process is simple and easy to implement.

Figure 6:
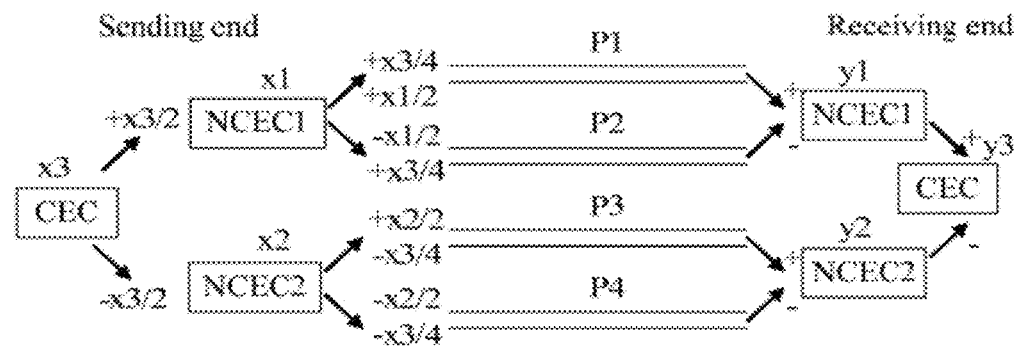
FIG. 6 is a schematic diagram of distribution of signals transmitted on 3 extended channels obtained by 4 twisted-pair channels provided by Embodiment 2 of the present invention.

In order to further illustrate that the method provided by this embodiment may prevent signal coupling between channels, the method is specifically described below with reference to FIG. 6. Referring to FIG. 6, 4 UTPs correspond to 4 twisted-pair channels P1, P2, P3 and P4, two NCEC channels: an NCEC1 channel and an NCEC2 channel, and a CEC channel are obtained by extension. Signals sent by the NCEC1 channel, the NCEC2 channel, and the CEC channel at the sending end are respectively x1, x2 and x3, and signals received at the receiving end are respectively y1, y2 and y3. A signal sent by each extended channel is divided into two signals that are equal in size and opposite in direction and are transmitted as common-mode signals of twisted-pair channels. An x1 signal over the NCEC1 channel is divided into +x1/2 and −x1/2, which are respectively transmitted as a common-mode signal of the P1 channel and a common-mode signal of the P2 channel. An x2 signal over the NCEC2 channel is divided into +x2/2 and −x2/2, which are respectively transmitted as a common-mode signal of the P3 channel and a common-mode signal of the P4 channel. An x3 signal over the CEC channel is divided into +x3/2 and −x3/2, which are respectively transmitted as a common-mode signal of the NCEC1 channel and a common-mode signal of the NCEC2 channel. When passing through the NCEC1 channel, +x3/2 is divided into +x3/4 and +x3/4, which are respectively transmitted as a common-mode signal of the P1 channel and a common-mode signal of the P2 channel. When passing through the NCEC2 channel, −x3/2 is divided into −x3/4 and −x3/4, which are respectively transmitted as a common-mode signal of the P3 channel and a common-mode signal of the P4 channel. Therefore, a received signal y obtained at the receiving end may be expressed as:

$$y1=(+x1/2+x3/4)-(-x1/2+x3/4)=x1;$$

$$y2=(+x2/2-x3/4)-(-x2/2-x3/4)=x2;$$

$$y3=[(+x1/2+x3/4)+(-x1/2+x3/4)]-[(+x2/2-x3/4)+(-x2/2-x3/4)]=x3.$$

It may be seen from the above expressions that, received signal y1 over the NCEC1 channel merely includes the sent signal x1 of the channel, without the coupling of the sent signals x2 and x3 of the other channels; received signal y2 over the NCEC2 channel merely includes the sent signal x2 of the channel, without the coupling of the sent signals x1 and x3 of the other channels; and received signal y3 over the CEC channel merely includes the sent signal x3 of the channel, without the coupling of the sent signals x1 and x2 of the other channels. Therefore, with the method provided by this embodiment, signal coupling between channels may be prevented, and in comparison with the prior art, the interference is significantly reduced.

Embodiment 3

Figure 7:
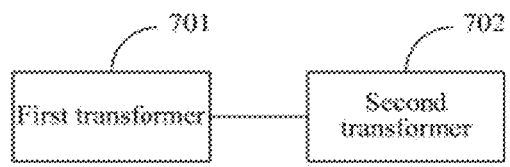
FIG. 7 is a structural diagram of a device for extending channels provided by Embodiment 3 of the present invention.

Referring to FIG. 7, this embodiment provides a device for extending channels, where a common-mode signal is extracted by using a central tap of a transformer. The device includes:

a first transformer 701, connected to a first channel, and having a first central tap; and a second transformer 702, connected to a second channel, and having a second central tap, where a signal over the first central tap is a common-mode signal of the first channel, a signal over the second central tap is a common-mode signal of the second channel, and the signal over the first central tap and the signal over the second central tap are differentiated to generate a non-cascade extended channel; and the first channel and the second channel are both twisted-pair channels.

In this embodiment, in the first implementation manner, the device may further include:

a third transformer, having two ends each connected to the first central tap and the second central tap, and having a third central tap; and a fourth transformer, connected to a fourth channel, and having a fourth central tap, where a signal over the third central tap is a common-mode signal of the non-cascade extended channel, a signal over the fourth central tap is a common-mode signal of the fourth channel, and the signal over the third central tap and the signal over the fourth central tap are differentiated to generate a first-level cascade extended channel; and the fourth channel is a twisted-pair channel or a non-cascade extended channel. In this implementation manner, if the fourth channel is a non-cascade extended channel, the generated first-level cascade extended channel is a balanced channel, and if the fourth channel is a twisted-pair channel, the generated first-level cascade extended channel is an unbalanced channel. The following is a specific description with figures as examples.

Figure 8:
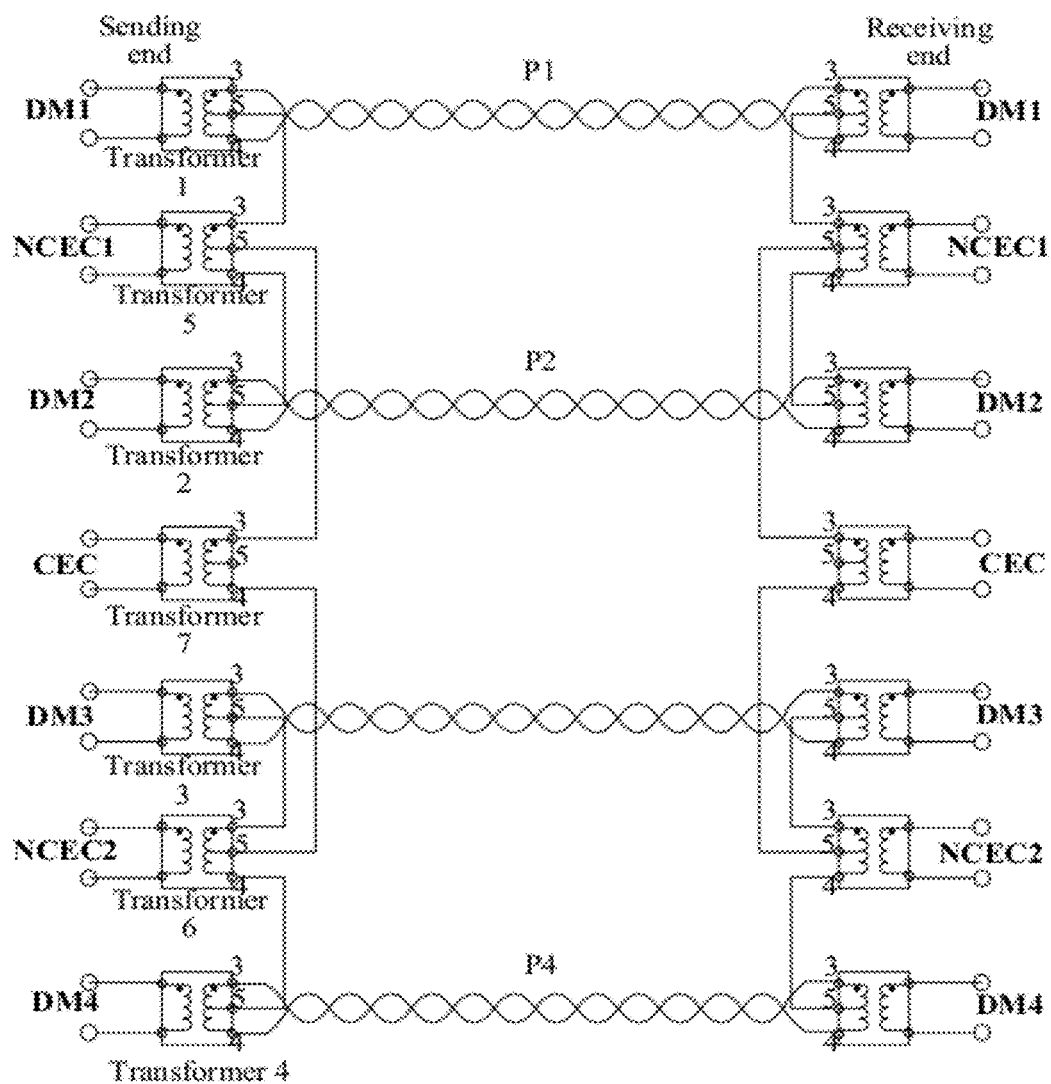
FIG. 8 is a schematic circuit diagram of 3 extended channels generated by 4 twisted-pair channels provided by Embodiment 3 of the present invention.

Referring to FIG. 8, a situation that the fourth channel is a non-cascade extended channel is shown. 4 UTPs are shown, which correspond to 4 twisted-pair channels P1, P2, P3 and P4. A transformer 1, a transformer 2, a transformer 3 and a transformer 4 are respectively connected to the 4 twisted-pair channels, and each transformer has a central tap. A signal over the central tap is a common-mode signal of a corresponding twisted-pair channel. Two ends of the transformer are respectively represented by 3 and 4, and the central tap is represented by 5. DM1, DM2, DM3 and DM4 respectively represent differential-mode signals of 4 twisted-pair channels, and are used to transmit signals that exist before the extended channels are generated. A signal over the central tap of the transformer 1 and a signal over the central tap of the transformer 2 are differentiated to generate an NCEC1 channel, and a signal over the central tap of the transformer 3 and a signal over the central tap of the transformer 4 are differentiated to generate an NCEC2 channel. Furthermore, a transformer 5 and a transformer 6 may be further added. Two ends of the transformer 5 are respectively connected to the central tap of the transformer 1 and the central tap of the transformer 2, two ends of the transformer 6 are respectively connected to the central tap of the transformer 3 and the central tap of the transformer 4, and a central tap is respectively extended from the transformer 5 and the transformer 6. Signals over the central taps of the transformer 5 and the transformer 6 are differentiated to generate a first-level cascade extended channel CEC. A transformer 7 in FIG. 8 is not necessary, and may be used or may not be used, which is not limited in the embodiment of the present invention. When the transformer 7 is used, two ends of the transformer 7 are respectively connected to the central tap of the transformer 5 and the central tap of the transformer 6. In the application scenario shown in FIG. 8, the extended channels that are generated are all balanced channels, and are longitudinally balanced in morphology.

Figure 9:
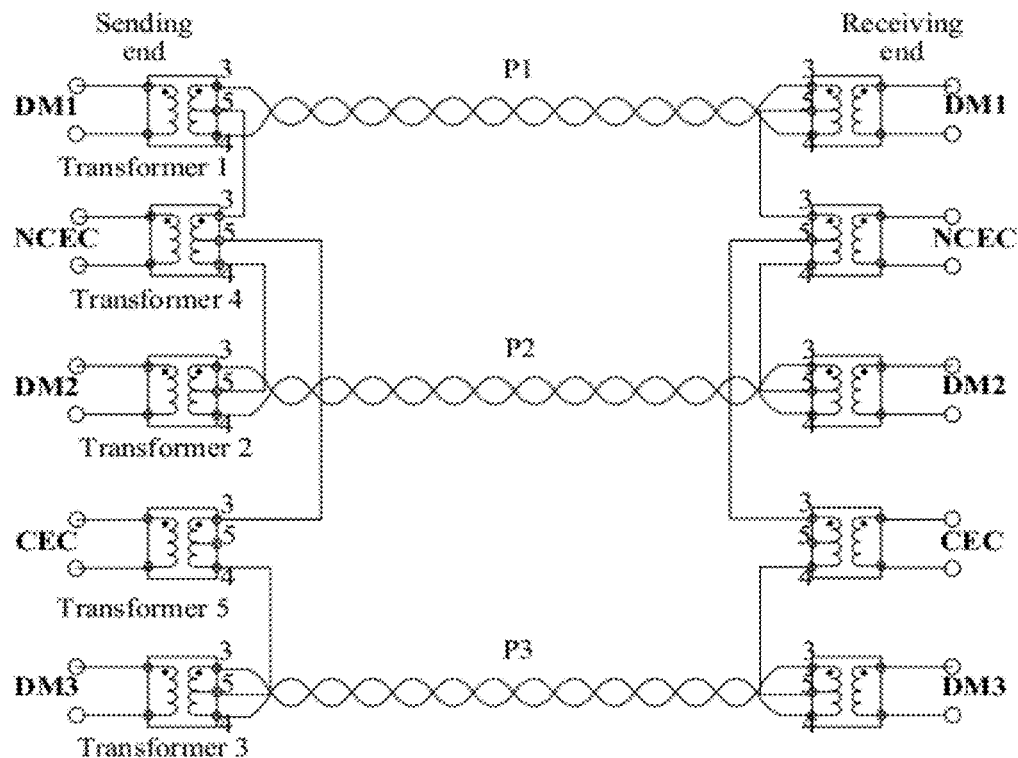
FIG. 9 is a schematic circuit diagram of 2 extended channels generated by 3 twisted-pair channels provided by Embodiment 3 of the present invention.

Referring to FIG. 9, a situation that the fourth channel is a twisted-pair channel is shown. 3 UTPs are shown, which correspond to 3 twisted-pair channels P1, P2 and P3. A transformer 1, a transformer 2 and a transformer 3 are respectively connected to the 3 twisted-pair channels, and each transformer has a central tap, where a signal over the central tap is a common-mode signal of the corresponding twisted-pair channel. Two ends of the transformer are respectively represented by 3 and 4, and the central tap is represented by 5. DM1, DM2 and DM3 respectively represent differential-mode signals of the 3 twisted-pair channels, and are used to transmit signals that exist before the extended channels are generated. A signal over the central tap of the transformer 1 and a signal over the central tap of the transformer 2 are differentiated to generate an NCEC channel. Two ends of the transformer 4 each are connected to the central tap of the transformer 1 and the central tap of the transformer 2, and a central tap is extended from the transformer 4. Signals over the central taps of the transformer 3 and the transformer 4 are differentiated to generate a first-level CEC channel. The transformer 5 in FIG. 9 is not necessary, which may be used or may not be used and is not limited in the embodiment of the present invention. When the transformer 5 is used, two ends of the transformer 5 are respectively connected to the central tap of the transformer 3 and the central tap of the transformer 4. In the application scenario shown in FIG. 9, the NCEC channel that is generated is a balanced channel, and is longitudinally balanced in morphology. The generated first-level CEC channel is an unbalanced channel, and is longitudinal unbalanced in morphology. It should be noted that, CCMs of the 3 UTPs are asymmetrical, that is, a positive signal of the CCM is transmitted by using 2 UTPs, and a negative signal of the CCM is transmitted by merely using 1 UTP. The longitudinal balance of this type of channel is lower than that of a common channel, but this type of channel may be used in a situation that the line is not too long.

In this embodiment, in the second implementation manner, the device may further include:

a fifth transformer, connected to a fifth channel, and having a fifth central tap; and a sixth transformer, connected to a sixth channel, and having a sixth central tap, where a signal over the fifth central tap is a common-mode signal of the fifth channel, a signal over the sixth central tap is a common-mode signal of the sixth channel, the fifth channel is any one of the cascade extended channels that are generated, the sixth channel is a twisted-pair channel, a non-cascade extended channel or any one of the cascade extended channels that are generated, and the signal over the fifth central tap and the signal over the sixth central tap are differentiated to generate a new cascade extended channel.

In the second implementation manner, when the sixth channel is any one of the cascade extended channels that are generated, the level of the fifth channel and the level of the sixth channel may be the same, and may also be different, for example, may be a first-level cascade extended channel and a second-level cascade extended channel respectively, or may be a third-level cascade extended channel and a fifth-level cascade extended channel respectively, which is not limited in the embodiment of the present invention.

In this embodiment, in any implementation manner, the device may be a sending end device or a receiving end device. In the two situations, the structure and function of the device are similar, and the difference merely lies in whether the device sends signals or receives signals, so details are not described here again.

In the foregoing method embodiments, in the scenario of N twisted-pair channels, (N−1) extended channels are obtained in a fixed sequence, accordingly, the process may also be implemented in the device by using transformers, and the principle and method are the same, so details are not described here again.

According to the device provide by this embodiment, a non-cascade extended channel is generated by extracting common-mode signals by using central taps of transformers, which provides a specific implementation manner for extending channels, and the process is simple and easy to implement. Furthermore, a cascade extended channel may be generated based on the non-cascade extended channel. After a signal over the cascade extended channel is divided into two parts, a signal passing through the part of the non-cascade extended channel is transmitted by using two pairs of twisted-pair channels. Compared with the prior art, as more twisted-pair channels are used, the transmission performance of the extended channel is improved. Moreover, the non-cascade extended channel and the cascade extended channel that are generated both use the common-mode signal of the twisted-pair channel to transmit signals, so signal coupling between channels is prevented, and in comparison with the prior art, interference is significantly reduced, and the transmission performance of the line is improved. Additionally, the availability of the extended channels is detected, and an unavailable extended channel may be disabled, so that the transmission performance of the channel may be further improved, the flexibility is improved, and the process is simple and easy to implement.

Embodiment 4

Figure 10:
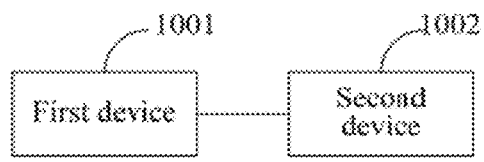
FIG. 10 is a structural diagram of a system for extending channels provided by Embodiment 4 of the present invention.

Referring to FIG. 10, this embodiment provides a system for extending channels, where the system includes a first device 1001 and a second device 1002. The first device 1001 is the device for extending channels in any implementation manner in the device embodiment and is a device at a network side, and the second device 1002 is the device for extending channels in any implementation manner in the device embodiment and is a device at a user side.

In this embodiment, two scenarios are included: the first device 1001 is a sending end device, and the second device 1002 is a receiving end device; or the second device 1002 is a sending end device, and the first device 1001 is a receiving end device.

In this embodiment, the first device 1001 may be an independent device, and may also be integrated with a DSLAM at a network side.

In this embodiment, the above system may further include:

a control module, located at the network side, and configured to detect the availability of extended channels after the extended channels are generated by the first device and the second device, and if an unavailable extended channel exists, disable the unavailable extended channel, where the extended channels include non-cascade extended channels and cascade extended channels.

In this embodiment, the first device 1001 and the second device 1002 may be both connected to N twisted-pair channels, and a total number of all obtained extended channels is M, where N and M are natural numbers, and all the extended channels include non-cascade extended channels and cascade extended channels; accordingly, the above system further includes a crosstalk cancellation module or a vector precoding module.

The crosstalk cancellation module is located at the network side, and is configured to, after a signal is received from N twisted-pair channels and M extended channels through the first device 1001, perform a crosstalk cancellation process on the received signal, where a crosstalk cancellation matrix used in the crosstalk cancellation process is a matrix of (N+M) rows and (N+M) columns on each sub-carrier.

The vector precoding module is located at the network side, and is configured to, when a signal is sent to the N twisted-pair channels and the M extended channels through the first device 1001, first perform a vector precoding process on the signal and then send the signal, where a vector precoding matrix used in the vector precoding process is a matrix of (N+M) rows and (N+M) columns on each sub-carrier.

In this embodiment, at least one of the control module, the crosstalk cancellation module and the vector precoding module may be disposed in a DSLAM at the network side. When being disposed in a DSLAM, the first device may be integrated inside the DSLAM, and may also be an independent device. The crosstalk cancellation matrix and the vector precoding matrix are the same as those described in the method embodiment, so details are not described here again.

The system provided by this embodiment is formed by the first device at the network side and the second device at the user side, and the first device and the second device both extract common-mode signals by using central taps of transformers, which provides a specific implementation manner for extending channels, and the process is simple and easy to implement. Furthermore, both the first device and the second device may generate a cascade extended channel based on a non-cascade extended channel. After a signal over the cascade extended channel is divided into two parts, a signal passing through the part of the non-cascade extended channel is transmitted by using two pairs of twisted-pair channels. Compared with the prior art, as more twisted-pair channels are used, the transmission performance of the extended channel is improved. Moreover, the non-cascade extended channel and the cascade extended channel that are generated both use the common-mode signals of the twisted-pair channels to transmit signals, so signal coupling between channels is prevented, and in comparison with the prior art, interference is significantly reduced, and the transmission performance of the line is improved. Additionally, the availability of the extended channels is detected, and an unavailable extended channel may be disabled, so that the transmission performance of the channel may be further improved, the flexibility is improved, and the process is simple and easy to implement.

Finally, it should be noted that, persons skilled in the art should understand that all or a part of the steps in the method according to the embodiments of the present invention may be implemented by a program instructing relevant hardware, and the program may be stored in a computer readable storage medium. When the program is run, steps of the method according to the embodiments of the present invention are performed. The storage medium may be a magnetic disk, an optical disk, a read only memory (ROM), a random access memory (RAM), and the like.

Various functional units according to the embodiments of the present invention may be integrated in one processing module or may exist as various separate physical units, or two or more units may be integrated in one module. The integrated module may be implemented through hardware, or may also be implemented in a form of a software functional module. When the integrated module is implemented in the form of the software functional module and sold or used as a separate product, the integrated module may also be stored in a computer readable storage medium. The storage medium may be a read only memory, a magnetic disk, an optical disk, or the like. The devices or systems may execute the method in the corresponding method embodiment.

The above descriptions are merely exemplary embodiments of the present invention, but not intended to limit the present invention. Any modification, equivalent replacement, or improvement made without departing from the spirit and principle of the present invention should fall within the protection scope of the present invention.

What is claimed is:

1. A method for extending channels, comprising:
   generating a non-cascade extended channel by using a first channel and a second channel; and
   generating a first-level cascade extended channel by using the non-cascade extended channel and a third channel,
   wherein the first channel and the second channel are both twisted-pair channels, and the third channel is a twisted-pair channel or another non-cascade extended channel;
   wherein the number of the twisted-pair channels is N, a total number of all generated extended channels is M, wherein N and M are both natural numbers, and all the extended channels comprises non-cascade extended channels and cascade extended channels, the method further comprising:
   after receiving a signal from the N twisted-pair channels and the M extended channels, performing a crosstalk cancellation process on the received signal, wherein a crosstalk cancellation matrix used in the crosstalk cancellation process is a matrix of (N+M) rows and (N+M) columns on each sub-carrier; and
   when sending a signal to the N twisted-pair channels and the M extended channels, performing a vector precoding process on the signal and then sending the signal, wherein a vector precoding matrix used in the vector precoding process is a matrix of (N+M) rows and (N+M) columns on each sub-carrier.

2. The method according to claim 1, wherein the generating the non-cascade extended channel by using the first channel and the second channel comprises:
   differentiating a common-mode signal of the first channel and a common-mode signal of the second channel to generate the non-cascade extended channel; and
   the generating the first-level cascade extended channel by using the non-cascade extended channel and the third channel comprises:
   differentiating a common-mode signal of the non-cascade extended channel and a common-mode signal of the third channel to generate the first-level cascade extended channel.

3. The method according to claim 2, wherein after the generating the first-level cascade extended channel, the method further comprises:
   differentiating a common-mode signal of any one of cascade extended channels that are generated and a common-mode signal of a fourth channel, to generate a new cascade extended channel,
   wherein the fourth channel is a twisted-pair channel, a non-cascade extended channel or any one of the cascade extended channels that are generated.

4. The method according to claim 2, wherein when the number of the twisted-pair channels is N and the N twisted-pair channels comprise the first channel and the second channel, wherein N is a natural number greater than 2,
   wherein the generating the non-cascade channel further comprises:
   differentiating common-mode signals of each two twisted-pair channels in remaining twisted-pair channels among the N twisted-pair channels except the first channel and the second channel to generate a corresponding non-cascade extended channel; and
   the third channel is a non-cascade extended channel, and the method further comprises:
   differentiating common-mode signals of each two non-cascade extended channels in remaining non-cascade extended channels among all the non-cascade extended channels that are generated except the two non-cascade extended channels used by the first-level cascade extended channel, to generate a corresponding first-level cascade extended channel; and
   starting from all the first-level cascade extended channels that are generated, according to a principle of differentiating common-mode signals of each two cascade extended channels at a same level to generate a higher-level cascade extended channel, generating a cascade extended channel level by level, till a highest-level cascade extended channel is obtained, and the number of the highest-level cascade extended channel is one.

5. The method according to claim 4, wherein after the generating the cascade extended channel level by level till the highest-level cascade extended channel is obtained, and the method further comprises:
   if at least two unused channels exist, randomly selecting two unused channels each time to differentiate common-mode signals of the unused channels so as to generate a corresponding unbalanced cascade extended channel, and each time using a generated unbalanced cascade extended channel as an unused channel selectable for a next time, till the number of the unused channel is one,
   wherein the unused channel refers to a twisted-pair channel, a non-cascade extended channel or a cascade extended channel of which a common-mode signal is not used.

6. The method according to claim 5, wherein the randomly selecting two channels each time to differentiate the common-mode signals of the channels so as to generate the corresponding unbalanced cascade extended channel, and each time using the generated unbalanced cascade extended channel as the unused channel selectable for the next time, till the number of the unused channel is one, comprises:
   each time according to the sequence of a level from the twisted-pair channel to the non-cascade extended channel and then to the cascade extended channel, and the sequence of the cascade extended channel from a low level to a high level, selecting two levels of channels and differentiating common-mode signals of the channels to generate a corresponding unbalanced cascade extended channel, and each time using the generated unbalanced cascade extended channel as an unused channel selectable for a next time, till the number of the unused channel is one.

7. The method according to any one of claim 1, further comprising:
   after generating extended channels, detecting availability of the extended channels, and if an unavailable extended channel exists, disabling the unavailable extended channel;
   wherein the extended channels comprise non-cascade extended channels and cascade extended channels.

8. A device for extending channels, comprising:
   a first transformer connected to a first channel, and having a first central tap; and
   a second transformer, connected to a second channel and having a second central tap,
   wherein a signal over the first central tap is a common-mode signal of the first channel, a signal over the second central tap is a common-mode signal of the second channel, and the signal over the first central tap and the signal over the second central tap are differentiated to generate a non-cascade extended channel; and the first channel and the second channel are both twisted-pair channels;
   a third transformer, having two ends each connected to the first central tap and the second central tap, and having a third central tap; and
   a fourth transformer, connected to a fourth channel, and having a fourth central tap,
   wherein a signal over the third central tap is a common-mode signal of the non-cascade extended channel, a signal over the fourth central tap is a common-mode signals of the fourth channel, and the signal over the third central tap and the signal over the fourth central tap are differentiated to generate a first-level cascade extended channel; and the fourth channel is a twisted-pair channel or a non-cascade extended channel;
   and wherein the first device and the second device are both connected to N twisted-pair channels, a total number of all the extended channels that are obtained is M, where N and M are both natural numbers, and all the extended channels comprise non-cascade extended channels and cascade extended channels;
   a crosstalk cancellation module, located at the network side, and configured to, after a signal is received from the N twisted-pair channels and the M extended channels through the first device, perform a crosstalk cancellation process on a received signal, wherein a crosstalk cancellation matrix used in the crosstalk cancellation process is a matrix of (N+M) rows and (N+M) columns on each sub-carrier; and
   a vector precoding module, located at the network side, and configured to, when a signal is sent to the N twisted-pair channels and the M extended channels through the first device, first perform a vector precoding process on the signal and then send the signal, wherein a vector precoding matrix used in the vector precoding process is a matrix of (N+M) rows and (N+M) columns on each sub-carrier.

* * * * *